(12) United States Patent  (10) Patent No.: US 7,604,379 B2
Stenback et al.  (45) Date of Patent: Oct. 20, 2009

(54) FLUORESCENT LIGHT FIXTURE

(75) Inventors: Michael Stenback, Birmingham, MI (US); Gary Dillon, Grosse Point Farms, MI (US); Scott Anton, Rochester Hills, MI (US); Paul von Zittwitz, Macomb, MI (US)

(73) Assignee: Alumalight, L.L.C., Troy, MI (US)

( * ) Notice: Subject to any disclaimer, the term of this patent is extended or adjusted under 35 U.S.C. 154(b) by 0 days.

(21) Appl. No.: 12/025,242

(22) Filed: Feb. 4, 2008

(65) Prior Publication Data

US 2009/0034263 A1  Feb. 5, 2009

Related U.S. Application Data

(60) Provisional application No. 60/953,738, filed on Aug. 3, 2007.

(51) Int. Cl.
*F21V 23/02* (2006.01)
(52) U.S. Cl. .................. 362/260; 362/218; 362/219; 362/220; 362/225; 362/373
(58) Field of Classification Search ......... 362/217–219, 362/225, 260, 362, 373, 151–152
See application file for complete search history.

(56) References Cited

U.S. PATENT DOCUMENTS

| | | | |
|---|---|---|---|
| 3,514,590 A | 5/1970 | Shaeffer | |
| 3,562,511 A | 2/1971 | Reeves | |
| 3,673,402 A | 6/1972 | Weiss | |
| 3,710,094 A * | 1/1973 | Monte et al. ............... | 362/218 |
| 4,459,735 A | 7/1984 | Sawdon | |
| 5,003,232 A | 3/1991 | Venderbosch | |
| 5,368,495 A | 11/1994 | Raby, Sr. et al. | |
| 5,473,522 A | 12/1995 | Kriz et al. | |
| 5,720,546 A | 2/1998 | Correll, Jr. et al. | |
| 5,727,871 A | 3/1998 | Kotloff | |
| 5,744,912 A | 4/1998 | So | |
| 5,803,589 A | 9/1998 | Lee | |
| 5,823,663 A | 10/1998 | Bell et al. | |
| 5,954,421 A | 9/1999 | McGrath | |
| 5,988,836 A | 11/1999 | Swarens | |
| 6,059,424 A | 5/2000 | Kotloff | |
| 6,092,913 A | 7/2000 | Edwards, Jr. | |
| 6,164,797 A | 12/2000 | Crane et al. | |
| 6,170,962 B1 | 1/2001 | Wordin | |
| 6,210,025 B1 | 4/2001 | Schmidt et al. | |
| 6,257,735 B1 | 7/2001 | Baar | |
| 6,428,183 B1 | 8/2002 | McAlpin | |
| 6,541,720 B2 | 4/2003 | Gerald et al. | |

(Continued)

FOREIGN PATENT DOCUMENTS

JP  2004-014361  1/2004

(Continued)

*Primary Examiner*—Jason Moon Han
(74) *Attorney, Agent, or Firm*—Young Basile

(57) ABSTRACT

A fluorescent light fixture is disclosed which is modular in construction and capable of accommodating different types and numbers of light tubes. The light fixture includes a first and a second socket bridge which include a plurality of socket mounting holes in a first and a second row to accommodate different lengths of light tubes as well as varying numbers and locational positions of the light tubes in the fixture.

20 Claims, 3 Drawing Sheets

U.S. PATENT DOCUMENTS

| | | |
|---|---|---|
| 6,558,020 B1 | 5/2003 | Holzer |
| 6,575,594 B1 | 6/2003 | Jafari |
| 6,676,425 B2 | 1/2004 | Lewis |
| 6,773,284 B2 | 8/2004 | Shah |
| 6,864,635 B2 | 3/2005 | Moon |
| 6,932,493 B2 | 8/2005 | Giannopoulos et al. |
| 6,945,671 B1 | 9/2005 | Swarens et al. |
| 6,984,131 B2 | 1/2006 | Shah |
| 7,036,957 B2 | 5/2006 | Paravantsos |
| 7,175,312 B2 | 2/2007 | Fowler, Jr. |
| 7,175,315 B2 | 2/2007 | Eaton |
| 7,207,690 B2 | 4/2007 | Haugaard et al. |
| 2005/0073838 A1* | 4/2005 | Haugaard et al. ........... 362/225 |
| 2005/0088844 A1 | 4/2005 | Wordin et al. |
| 2006/0023450 A1 | 2/2006 | Chung et al. |

FOREIGN PATENT DOCUMENTS

| | | |
|---|---|---|
| KR | 20-0203500 Y1 | 11/2000 |
| KR | 10-0734510 B1 | 6/2007 |

* cited by examiner

US 7,604,379 B2

FLUORESCENT LIGHT FIXTURE

CROSS REFERENCE TO RELATED APPLICATION

This application claims priority of Provisional Patent Application Ser. No. 60/953,738, filed Aug. 3, 2007, which is herein incorporated by reference in its entirety.

FIELD OF THE INVENTION

The invention generally pertains to fluorescent light fixtures.

BACKGROUND

Fluorescent light tube fixtures have long been used in commercial applications due to their advantages over incandescent lighting. The most common commercial application for years were fixtures using three or four fluorescent bulbs or light tubes in 48 inch lengths. The typical fixtures housing these light tubes for these applications were generally made from numerous pieces of thin, flexible sheet metal assembled with many bendable flanges, screws and/or rivets. The manufacturing, assembly and service of these prior fixtures was time consuming and costly.

These prior fixtures were typically designed and assembled to accept only light tubes of certain a length, typically 48 inches, with a fixed number, commonly four or eight, and positioned in fixed locations in the fixture. These common dedicated prior fixtures were initially equipped and sold with all of the associated hardware, for example ballasts, wiring and sockets, for the predetermined type and number of light tubes. This inflexibility in design is disadvantageous to consumers both at the point of sale as well as during the service life of the light. Purchasers of new fixtures were constrained to purchase, for example, a four tube light fixture when only two or three light tubes were needed to illuminate a particular area. In this instance, one or two of the four tubes could be removed which is unsightly and due to the fixed location of the tubes, uneven illumination of the target area results. Likewise, if a change in the illumination was desired during the service life of the fixture, tubes would have to either be removed or if the new desired illumination exceeded the fixed number of tubes that the fixture could accommodate, a new fixture would need to be purchased.

Progression of fluorescent lighting tube technology has further introduced metric-length fluorescent tubes, for example T5 style tubes, which are about 45.8 inches as compared with the typical English-length, for example T8 style tubes, which are about 48 inches. Prior light fixtures that were designed to accept English-length cannot accept the shorter tubes limiting consumers' choices on tube selection. To accommodate the difference in length, separate conversion devices have been employed in an attempt to make up the difference in lengths between the types of tubes. These separate conversion devices or adaptors are disadvantageous as they require separate purchase and retrofitting into the existing fixtures, are relatively complex in design and add to the already numerous pieces of existing fixtures.

Due to the disadvantages in existing light fixture designs, there is a need for a light fixture that is universal and modular in its ability to accommodate the different types, numbers and positional locations of light tubes in one fixture. It is further advantageous for a light fixture to be both customizable at initial assembly to meet a purchasing customer's requirements and easily adaptable in the field to meet changing illumination or application requirements. It is further desirable to have a light fixture that is economic to manufacture, assemble and service throughout the life of the fixture.

SUMMARY

The present invention is a fluorescent light fixture which provides increased flexibility and customization in the type and number of fluorescent lamps that may be utilized and is efficiently and economically manufactured, assembled, and is highly functional, adaptable and serviceable in use.

The light fixture of the present invention may include a housing having a base, side panels angularly positioned with respect to the base, and end caps attached to the base and side panels forming an interior cavity for placing and mounting of the lamp tubes, lamp sockets, socket bridges to support the sockets, ballasts and other electrical components.

In one example of the invention, the fluorescent light fixture includes a first and a second socket bridge each bridge having a bank of socket mounting holes positioned along longitudinal and lateral axes such that the lamp sockets supporting the lamps may be selectively positioned and attached to the socket bridge to accommodate different lengths of lamps as well as different quantities of lamps to suit the particular application.

In another example of the invention, the housing is a stamped three-piece aluminum assembly including a base having integral angled side panels which are secured to separate end caps through the Tog-L-Loc® attachment process thereby eliminating the need for separate rivets, screws and other mechanical fasteners to form the housing structure.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
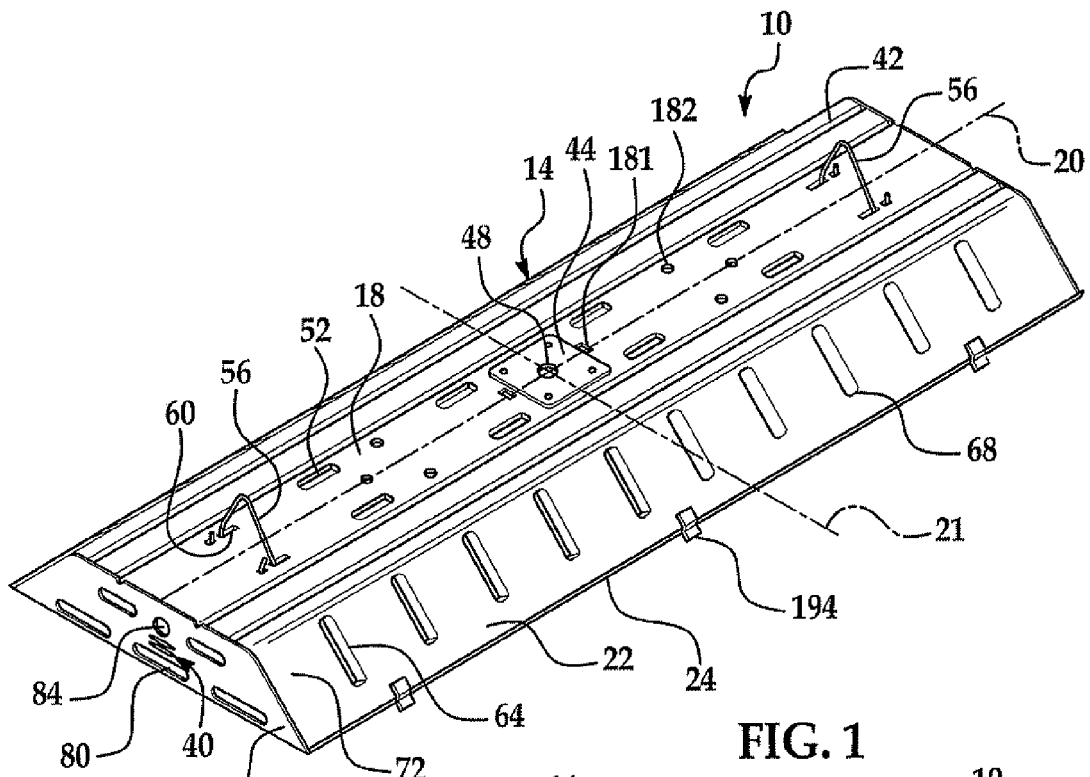
FIG. 1 is a perspective view of the fluorescent light fixture showing the outer or upper surface facing away from the area to be illuminated.
Figure 4:
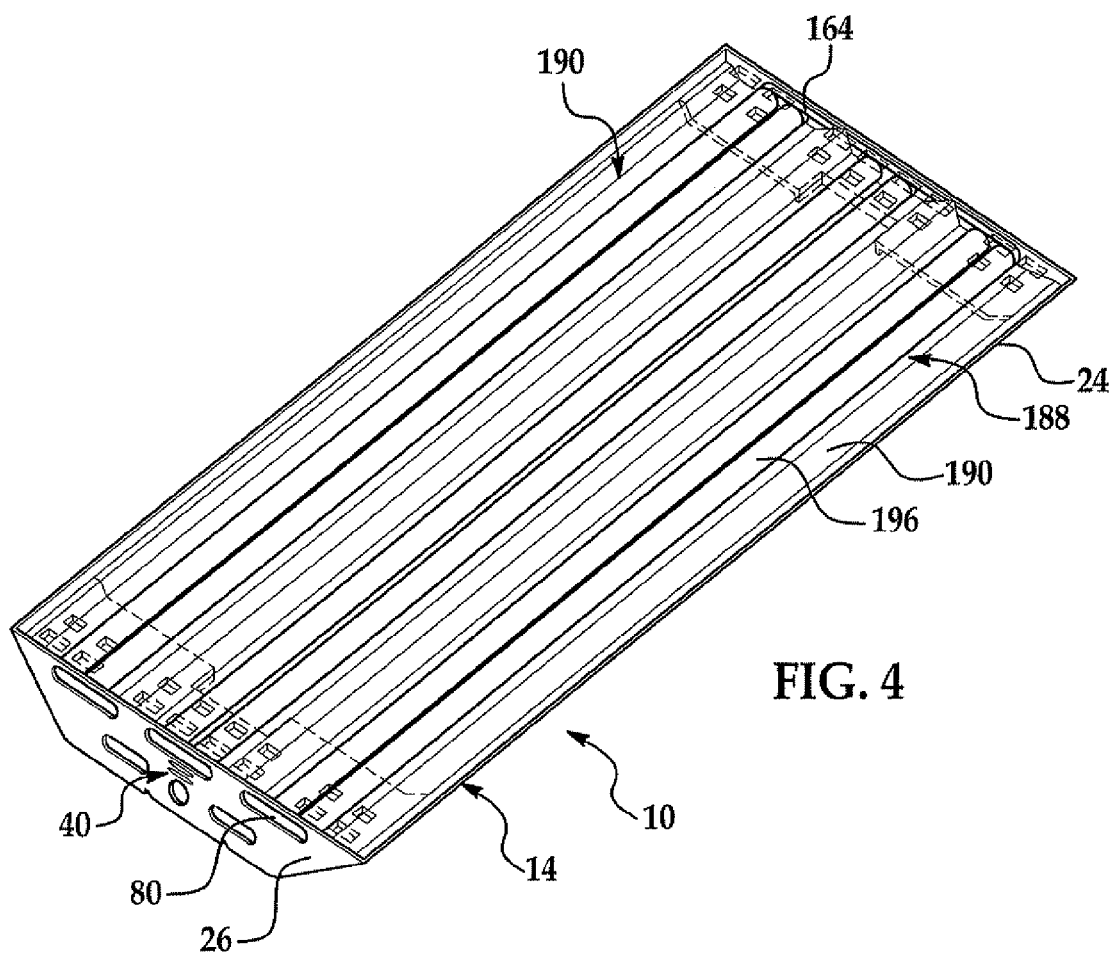
FIG. 4 is perspective view of the fluorescent light fixture in FIG. 1 as viewed from the underside showing the interior of the fluorescent light fixture and fluorescent lamps.
Figure 5:
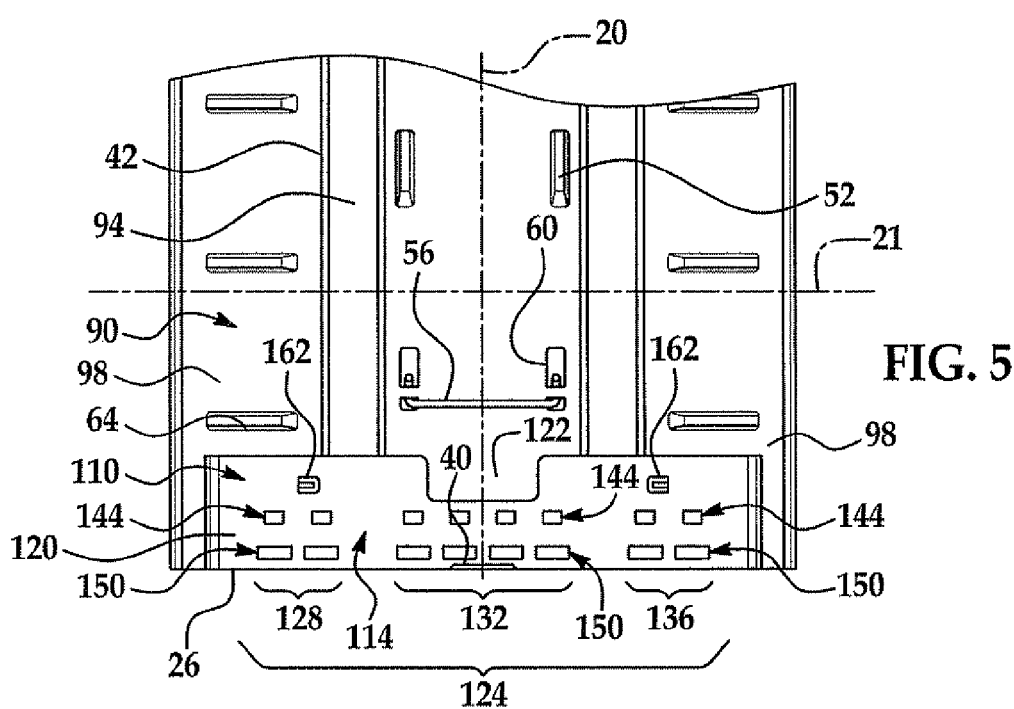
FIG. 5 is an enlarged, partial view of the left end of FIG. 4 with the fluorescent lamps and reflector removed showing the first socket bridge.
Figure 6:
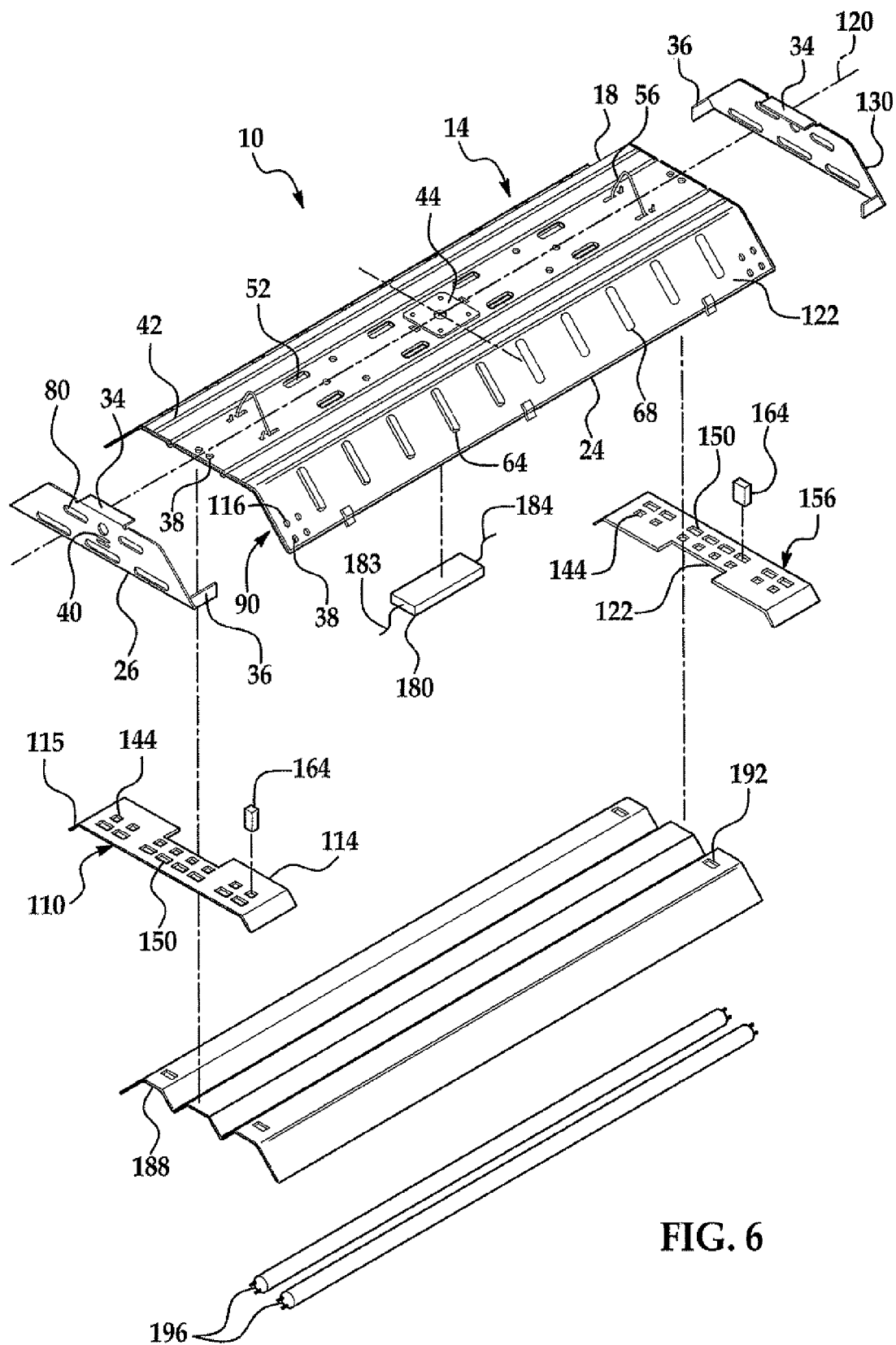
FIG. 6 is an exemplary exploded perspective view of the fluorescent light fixture.

An example of the inventive fluorescent light fixture 10 is shown in FIGS. 1-6. Referring to FIGS. 1 and 6, the light fixture 10 includes a housing 14 having an elongated base 18 defining a longitudinal axis 20 and a lateral axis 21.

Figure 2:
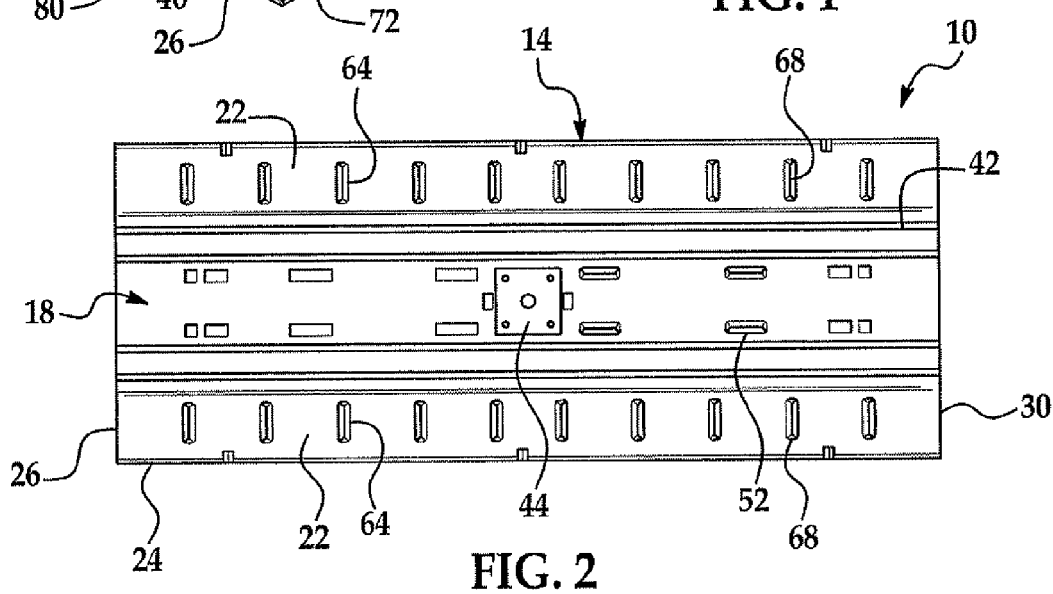
FIG. 2 is a top view of the fluorescent light fixture in FIG. 1.
Figure 3:
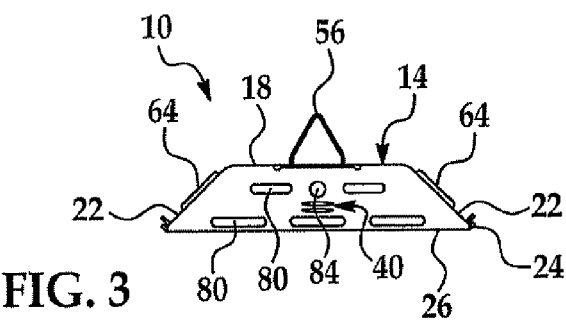
FIG. 3 is a left side end view of the fluorescent light fixture in FIG. 1.

In an example of light fixture 10, base 18 is generally planar and includes integral side panels 22 extending at a downward angle from base 18. As best seen in FIGS. 1-3, light fixture 10 further includes a separate first end cap 26 and a second end cap 30 positioned opposite one another on base 18 along the longitudinal axis 20. End caps 26 and 30 generally have a trapezoidal shape to accommodate and cover or close the opposing ends of base 18 and angled side panels 22 as best seen in FIG. 3. Side panels 22 end in a lip 24 at the outer or downward edge. It is understood that side panels 22 may be separate pieces from base 18 and that other shapes and configurations of base 10, side plates 22 and end caps 26 and 30 known by those skilled in the art may be used without deviating from the present invention.

In an example of light fixture 10, first 26 and second 30 end caps include a first flange 34 and second flanges 36 for securing the caps to the base 18. In one example, each cap includes two second flanges 36 positioned generally along the longitudinal axis 20 such that the flanges are positioned inside of the base 18 adjacent angled side panels 22. The flanges are fastened to the angled side panels 22 adjacent the opposing ends of base 18. In a preferred example, each end cap flange 34 and 36 is secured to a base 18 and side panel 22 respectively through use of the Tog-L-Loc® fastening system marketed by BTM Corporation. This process for fastening locally deforms, for example, both of the material layers of the side panel 22 and flanges 36 creating an inward projecting formation on one side of one of the layers, for example, on the inside surface of side panel 22. The deformation is then compressed axially downward back on itself thereby joining the two layers together thereby eliminating the necessity for welding, or separate fasteners such as screws, rivets or bolts. In one example shown in FIG. 6, two Tog-L-Loc formations are made for each flange 34 and 36 to base 18 and sides panels 22 (six total for each end cap). It is understood that attachment of first end cap 26 and second end cap 30 can be fastened to base 18 through other fastening tabs or structure on either the base 18 or the end caps and through other fastening means known by those skilled in the art.

In a preferred example of light fixture 10, the base 18 and first 26 and second 30 end caps are made from aluminum having a thickness of 0.063 inches. It has been found that the aluminum material is advantageous for the housing 14 in several respects including that it is light weight, resists corrosion, has good heat dissipation characteristics and is easily formed. It has also been found that aluminum in this thickness lends itself to be manufactured through high-volume stamping operations while maintaining the designed shape without significant warping or "spring-back." Several other structural and functional advantages are listed herein. A suitable aluminum for housing 14 is 5052 H32-H34. It is understood that different alloys and thickness of aluminum as well as different manufacturing processes and materials, for example steel, as known by those skilled in the art may be used without deviating from the present invention.

As shown in FIGS. 1, 2 and 6, housing 14 may include stiffening ribs 42 on base 18 positioned along the longitudinal axis 20 (four shown). The ribs are deformations formed into base 18 and provide additional stiffness and rigidity along the base allowing for a relatively thin base material may be used. The ribs 42 can be in a variety of shapes including triangular or semi-round, and can be in greater or lesser numbers and in other configurations and positions known by those skilled in the art to suit the particular application and environment.

In an example of light fixture 10, housing 14 further includes a center plate 44 positioned on base 18. Center plate 44 serves as a mounting plate to centrally mount fixture 10 to a supporting structure (not shown) and includes an aperture 48 for the passage of electrical wires from a power source (not shown) through the base 18 to one or more ballasts 180 further described below. Base 18 further includes a plurality of vents 52 positioned on the upper, generally planar surface. Vents 18 are outwardly extending projections defining holes through base 18 to allow for the passage of air and heat from the inside of the housing to the exterior. In one example, as opposed to a simple hole through base 18, the vents 52 are formed to create a cover over the opening to prevent dust and other debris from passing directly through the opening while maintaining a passageway for circulating air and heat to freely pass. In a preferred example, the openings for the vents 52 face at least two different directions so as to capture circulating air around the exterior of housing 14 for improved heat dissipation and cooling.

Base 18 further includes a pair of hooks 56 for hanging or securing fixture 10 from a supporting structure above the fixture. In this example, hooks 56 pass through apertures 60 in base 18 as best seen in FIG. 1 and are secured to base 18 through deformation of hook 56 around base 18. It is understood that variations to hooks 56 and mounting plate 44 to attach, hang or secure fixture 10 to a supporting structure known by those skilled in the art may be used without deviating from the present invention.

As best seen in FIGS. 1-3, housing 14 further includes a plurality of first side vents 64 and second side vents 68 in the side panels 22 positioned along the longitudinal axis 20. First 64 and second 68 side vents are similar in general construction to the base vents 52 as described above. In an example, first 46 and second 68 vents are outward projections or formations from side panel 22 forming an opening 72 for passage of air and heat between the interior and exterior of housing 14. In a preferred example, first side vent 64 openings faces toward first end cap 26 and second side vent 68 openings face toward second end cap 30 to take advantage of air circulation in multiple or changing directions around the exterior of housing 14. As with base vents 52, other configurations, shapes and orientations of side vents 64 and 68 known by those skilled in the art may be used.

As best seen in FIG. 3, similar to base vents 52, first 26 and second 30 end caps may include vent slots 80 which may be simple through holes or vents similar in construction to those previously described to further manage and control heat and air circulation in and about fixture 10. As seen in FIGS. 1 and 3, first 26 and second 30 end caps preferably include two stops 40 which are localized deformations of the end cap substrate material inward toward the interior cavity 90. First 26 and second 30 end caps may further include an aperture 84 for passage of electrical wires (not shown) through housing 14 where, for example, two fixtures 10 may be mounted end-to-end, or for attachment of a motion sensor (not shown) to detect movement of persons or objects in the area to be illuminated. The motion sensor is in electronic communication with the ballasts 180 to automatically turn on or activate lamp tubes 196 when, for example, a person or other moving object passes within the motion detector field of view to illuminate the area. Other sensors or controllers (not shown), for example, a timing device for automatically turning off or reducing the level of illumination when no movement is detected for a period of time to conserve energy, known by those skilled in the art may be used.

Referring to FIGS. 4, 5 and 6, base 18 and end caps 26 and 30 define an interior cavity 90 for placement, attachment and protection of the lighting components more fully identified below. In one example, base 18 includes a base inner surface 94 and side panels 22 include side inner surfaces 98. Fixture 10 includes a first socket bridge 110 and a second socket bridge 156 positioned inside of cavity 90 adjacent first end cap 26 and second end cap 30 respectively (see FIG. 5 for first socket bridge 110). First 110 and second 156 socket bridges are used to selectively position and secure two or more fluorescent lamp sockets 164 to fixture 10. Lamp sockets 164 generally include a receptacle (not shown) for receipt and electrical conductive connection of conductive lamp 196 pins (not shown). The lamp sockets 164 are typically specific to the type of lamp to be used, for example T5 or T8 style lamps and have flexible spring members or clips that compress inward and snap back to secure the socket to a mounting surface when a portion of the socket is passed through a hole in the mounting surface. Suitable sockets 164 include a T5 snap-in rotary socket or a T8 snap shunted socket manufactured by Leviton. Other sockets known by those skilled in the art may be used.

As best seen in FIGS. 5 and 6, in one example of fixture 10, first and second socket bridges 110 and 156 include a socket bridge body 114, side flanges 115 and a socket mounting surface 120 as best seen in FIG. 5. Bridge body 114 is configured to generally accommodate the cavity 90 configuration defined by inner base surface 94 and inner side panel surfaces 98 for attachment of socket bridge 110 to side panels 22 through, for example, Tog-L-loc attachment points 116. On installation of socket bridges 110 and 156, the body 114 is positioned between stops 40 formed in the end caps to provide support for each bridge for a more robust surface for mounting of the sockets, reflector and light tubes more fully discussed below. In one example, first 110 and second 156 socket bridges are made from SAE 1008-1010 galvanized steel It is understood that bridge body 114 can be of different configurations and materials as known by those skilled in the art without deviating from the present invention.

As best seen in FIGS. 5 and 6, in an example of first socket bridge 110 and second socket bridge 156, socket mounting surface 120 includes a bank of socket mounting holes 124 (16 shown for each bridge) for the selected positioning and mounting of lamp sockets 164 to accommodate different length lamp tubes 196 and in different quantities as more fully described below. As best seen in FIG. 5, in one example of the socket mounting hole placement and configuration, bank 124 includes a plurality of first socket holes 128 (four shown), a plurality of second socket holes 132 (eight shown) and a plurality of third socket holes 136 (four shown). In one example, each of the first 128, second 132 and third 136 sets of holes includes a first row 144 (eight total) positioned laterally across along lateral axis 21 and positioned inward of a second row 150 (eight total) along the longitudinal axis 20. Each exemplary socket hole is sized and configured to accommodate the mounting of lamp sockets 164 to first socket bridge 110 and second socket bridge 156 suitable for the type of lamp 196 to be used. As best seen in FIG. 5, in one example, each socket hole in first row 144 is narrower along lateral axis 21 than each hole in second row 50 to accommodate the different sockets 164 for different length and type lamps 196. A clearance opening 122 is shown in FIGS. 5 and 6 to aid in the attachment of end caps 26 and 30 to base 18.

In one example, following attachment of socket bridges 110 and 156 to side panels 22, the appropriate type and number of sockets 164 are secured to the socket bridges by positioning each socket between the base inner surface 94 and the underside of a socket bridge and pushing the socket end including the lamp receptacle partially through a socket hole until the socket spring members snap and secure the socket to the bridge.

Second socket bridge 156 may include the same socket hole pattern as described for first socket bridge 110 symmetrically about lateral axis 21. The selected positioning of sockets 164 in first socket bridge I 10 and complementary sockets in second bridge 156 allows for the custom or particularized installation of fluorescent lamps 196, both in type, length and in number, along the longitudinal axis 20 in fixture 10. It is understood that socket holes 128, 132 and 136 may vary in position, size and number to accommodate the lamp sockets and lamp configurations without deviating from the present invention.

In the exemplary configuration of first socket bridge 110 bank of socket holes 128, 132 and 136 in first row 144 and second row 150, and the complementary socket holes in second socket bridge 156, it is readily seen that there are multiple positions for the placement of lamp sockets 164 along longitudinal axis 20 through first row 144 and second row 150 to accommodate different length lamp tubes 196. This flexibility in socket placement along the longitudinal axis 20 allows fixture 10 to alternately receive both metric or English length lamps 196. For example, the shorter T5 fluorescent lamps could be installed in first row 144 or the longer T8 lamps can be installed in second row 150. Thus, the same fixture 10 can accommodate both common metric-based and English-based length lamps.

Similarly, in the exemplary configuration of first socket bridge 110 bank of socket holes 128, 132 and 136, the plurality of holes spaced laterally along the lateral axis 21 provides for selection and variation in the number of fluorescent lamp tubes 196 that can be received by fixture 10. For exemplary purposes, a user could configure fixture 10 to include 4 lamp tubes 196 with, for example, the placement of a lamp socket 164 in the outermost socket holes in first 128, second 132 (one on both sides of longitudinal axis 20), and third 136 both in both first socket bridge 110 and second socket bridge 156 (eight sockets total) followed by installation of the four lamp tubes 196. Alternately, if additional illumination is required, a user could easily configure the same fixture 10 to accommodate six lamp tubes 196 by also installing another pair of lamp sockets 164 in second socket holes 132 (four total across second holes 132). In both alternate examples, the fixture 10 second socket bridge 156 would include the complementary number of lamp sockets 164 in complementary positions along lateral axis 21. This flexibility or customization of fixture 10 to in the number of lamps is further complemented by the ability to receive both metric-based, for example T5, and English-based, for example T8, lamps as explained above.

Referring to FIGS. 1 and 6, Fixture 10 further includes one or more ballasts 180 attached to housing 14 to regulate the flow of current provided to the lamp sockets 164 for passage to, and illumination of, lamp tubes 196 as generally known by those skilled in the art. As best seen in FIG. 1, base 18 may include at least two first attachment formations or holes 181 generally positioned along at the center of base 18 along the longitudinal axis 20. In one example, two ballasts 180 may be installed, one on each side of lateral axis 21 by attachment of the ballasts by fasteners (not shown) to, or through, holes 181. In an example where additional or extended length ballasts are used, base 18 may further include second attachment formations or holes 182 positioned along longitudinal axis 20 but positioned outward from the center of base 18 for attachment of the ballasts in a similar manner as described above.

Ballast 180 is electrically connected to an external power source by wires 183 as generally known by those skilled in the art. Within fixture 10, ballast 180 is electrically connected to lamp sockets 164 through wires 184 as generally known by those skilled in the art. As an example, a suitable ballast 180 is, for example, a T5 high output universal voltage ballasts manufactured by Sylvania. It is understood that different type ballasts may be used based on the type of lamp 196 that will be used and depending on the performance requirements of the lamps 196 and fixture 10.

Referring to FIGS. 4, 5 and 6, fluorescent light fixture 10 may further include a separate reflector 188 having a highly reflective surface 190 to concentrate and focus light produced by lamps 196 in a downward direction to control so-called "up-lighting" thereby directing the light in a downward direction toward the intended area of illumination. In an example of fixture 10, first 110 and second 156 socket bridges each include a pair of hooks 162 protruding outward from mounting surface 120. Reflector 188 may include mounting holes 192 (four shown) for alignment with hooks 162 for attachment to first 110 and second 156 socket bridges. In one example, reflector 188 is flexed inward along lateral axis 21 so that hooks 162 are passed through holes 192 and then reflector 188 is allowed to relax and move to its unflexed position so that hooks 162 partially overlap reflective surface 190 to secure the reflector to fixture 10. It is understood that other methods for attaching reflector 188 to housing 14 may be used as generally known by those skilled in the art.

Fixture 10 may further include a lens or mesh grid (not shown) positioned over the opening of cavity 90 to protect the lamps 196 from contact by projectiles or other debris suitable to the fixture environment. Such exemplary grid may be attached to housing 14 by clamps 194 as best seen in FIG. 1. In one example, a translucent lens may be flexed and snapped over housing lip 24 to secure the lens to housing 14.

In one example of a method of making and assembling a fixture 10, base fixture 10 is assembled in a method by providing a stamped aluminum base 18 and securing first 26 and second 30 end caps to base 18 through the Tog-L-Loc fastener system as previously described. In one example, the end caps 26 and 30 and first 110 and second 156 socket bridges are positioned simultaneously in base 18 and secured to base 18 in the manner described. The housing 14 is customized to the particular lighting requirements or customer specifications through installation of the appropriate number of sockets 164 in the appropriate first, 128, second 132 and/or third 136 socket holes and in the first row 144 and/or second row 150 to accommodate the type, length and number of lamps 196 to suit the application. Sockets 164 are pressed from the underside of the socket bridges through the appropriate socket holes and secured in place for engaging receipt of lamps 196. One or more ballasts 180 are positioned and attached in mounting holes 181 and/or 182 to accommodate the size of the ballast and number of lamps 196. The ballast 180 is electrically connected to a power source and the sockets 164. A reflector 188 and lamps 196 are installed as described. A grid or lens may also be installed by clamps or other means to complete the assembly of an exemplary fixture 10.

As generally described above, in operation, fixture 10 includes one or more conventional lamp tubes 196 having connector pins (not shown) on both ends which electrically connect with lamp sockets 164 through receptacles in the lamp sockets 164. As described, fixture 10 is capable of receiving all common standard fluorescent lamp tubes including the metric-based lamps, for example T5, and English-based, for example T8, in both standard and high wattage output lamp versions, and in different quantities, for example four or six lamps, as described above. It is understood that different fluorescent lamps other than the T5 and T8, in different lengths other than the typical four-foot lengths as described herein and in different lamp configurations, as well as in different quantities other than four or six lamps, known by those skilled in the art may be used without deviating from the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A light fixture for use in receiving and supporting at least one electrically powered light tube, the light fixture comprising:
   an elongate base defining a longitudinal axis along the length of the base and a lateral axis along a width of the base substantially perpendicular to the longitudinal axis;
   a first universal light socket bridge extending along the lateral axis and connected to the base, the first socket bridge having a plurality of light tube socket holes spaced apart in alignment along the lateral axis in a first row and a second row positioned outward from the first row along the longitudinal axis; and
   a second light socket bridge positioned opposite the first socket bridge along the longitudinal axis and connected to the base, the second socket bridge extending along the lateral axis and having a first row of light socket holes aligned along the lateral axis with the first and second rows of socket holes in the first socket bridge, wherein the first and the second socket bridges are readily adaptable to accept a desired number and varying length of the at least one light tube through selective use of the first and the second rows of socket holes in the first socket bridge and the first row of socket holes in the second socket bridge.

2. The light fixture of claim 1 wherein the second socket bridge further comprises a second row of light socket holes positioned outward along the longitudinal axis in alignment with the first row of socket holes of the second light socket bridge along the lateral axis.

3. The light fixture of claim 2 wherein the first row and the second row of socket holes in the first and the second socket bridges are positioned along the longitudinal axis to accept metric system-based length tubes and English system-based length tubes respectively.

4. The light fixture of claim 3 wherein the metric length tubes are T5 and English length tubes are T8.

5. The light fixture of claim 1 wherein the first row of socket holes on at least the first socket bridge are narrower in length along the lateral axis than the second row of socket holes.

6. The light fixture of claim 1 wherein comprising at least one light socket mounted in each of the first and the second socket bridges, wherein the sockets receive and support the at least one light tube in the light fixture.

7. The light fixture of claim 1 wherein the base further defines a plurality of holes positioned along the longitudinal and lateral axes for universal mounting of at least one ballast to the base in electronic communication with the sockets to provide adequate power for the chosen number of the at least one light tube to be used in the light fixture.

8. The light fixture of claim 1 wherein the housing further comprises a plurality of integrally formed vents extending outward from the base and each defining a vent opening in communication with an interior cavity defined at least in part by the base, the plurality of vent openings positioned such that each of four respective directions along the longitudinal and the lateral axes includes at least one vent opening directed toward it and wherein all of the respective vent openings are positioned substantially perpendicular to the respective longitudinal and lateral axes.

9. A light fixture for use in receiving and supporting at least one electrically powered fluorescent light tube, the light fixture comprising:
a housing having an elongate base defining a longitudinal axis along a length of the base and integral angled side panels extending along a lateral axis along a width of the base substantially perpendicular to the longitudinal axis, the base and the side panels defining an interior cavity for receipt of the at least one light tube, the base further defining a plurality of ballast mounting holes for universal mounting of at least one ballast to provide power to the chosen number and type of the at least one fluorescent light tube;
a plurality of integrally formed vents extending away from the housing and each defining a vent opening in communication with the interior cavity, the plurality of vent openings positioned so that each of four respective directions along the longitudinal and the lateral axes includes at least one vent opening directed toward the respective direction and substantially perpendicular to the respective direction; and
a first and a second universal light socket bridge positioned in the interior cavity separated along the longitudinal axis and each extending along the lateral axis, each of the first and the second socket bridges are connected to the housing and define a plurality of light tube socket holes in a first row spaced apart and alignment along the lateral axis and a second row positioned outward from the first row along the longitudinal axis and in respective alignment with the other holes in the second row along the lateral axis, wherein the first and the second socket bridges are readily adaptable to accept a desired number and varying length of the at least one light tube through selective use of the first and the second rows of socket holes in the first and the second socket bridges.

10. The light fixture of claim 9 wherein the housing further comprises a first end cap and an opposing second end cap attached to opposing ends of the base and side panels.

11. The light fixture of claim 9 further comprising at least one light socket mounted in each of the first and the second socket bridges, wherein the sockets receive and support the at least one light tube in the light fixture.

12. The light fixture of claim 9 further comprising a reflector removably mounted to the first and the second socket bridges.

13. The light fixture of claim 9 wherein the first and the second socket bridges are connected to the housing without the use of separate mechanical fasteners.

14. The light fixture of claim 9 wherein the housing is formed from aluminum.

15. A method of assembling a universal light tube fixture comprising the steps of:
providing an elongate base defining a longitudinal axis along a length of the base and a lateral axis substantially perpendicular to the longitudinal axis;
mounting a universal first socket bridge to the base, the first socket bridge having a plurality of light tube socket holes spaced apart and in alignment along the lateral axis in a first row and a second row positioned outward from the first row along the longitudinal axis and in alignment with the other holes in the second row along the lateral axis;
mounting a second socket bridge to the base opposite the first socket bridge along the longitudinal axis, the second socket bridge having a plurality of light socket holes positioned in a first row aligned along the lateral axis with the first and the second rows of socket holes in the first socket bridge;
selecting a number and a length of light tubes to be used in the light fixture;
selecting a number and a type of ballasts compatible with the selected number and the length of light tubes;
selecting the socket holes from the first and the second rows of socket holes in the universal first socket bridge to accommodate the number and the lengths of the selected light tubes;
selecting the socket holes in the second socket bridge to accommodate the number of the selected light tubes;
mounting light tube sockets in the selected socket holes in the first and the second socket bridges corresponding to the selected number and the length of light tubes in electrical communication with the ballasts; and
mounting the selected number and the length of light tubes in the light sockets.

16. The method of claim 15 wherein the second socket bridge further comprises a second row of socket holes positioned outward of the first row of socket holes along the longitudinal axis and in alignment with the other holes in the second row of the second socket bridge along the lateral axis, the step of selecting socket holes in the second socket bridge further comprises selecting the socket holes from the first and the second rows of socket holes in the second socket bridge to accommodate the number and the lengths of the selected light tubes.

17. The method of claim 15 further comprising the step of mounting a first end cap and a second end cap on opposing ends of the housing.

18. The method of claim 15 further comprising the steps of mounting a reflector to the first and the second socket bridges prior to the mounting of the light tubes to the sockets.

19. The method of claim 15 wherein the step of mounting the first and the second socket bridges to the housing consists of deforming the socket bridge material and the adjacent housing material together without the use of separate fasteners or an independent source of thermal heat.

20. The method of claim 15 wherein the step of selecting the length of light tubes comprises selecting a first light tube having opposing ends and a first length and a second light tube having opposing ends and a second length longer than the first tube first length, and wherein the step of mounting the selected number and length of light tubes in the light sockets comprises the steps of mounting one end of the first light tube in a light socket mounted in the first socket bridge first row of socket holes and the opposing end in a light socket mounted in the second socket bridge first row of socket holes and mounting one end of the second light tube in a light socket mounted in the first socket bridge second row of socket holes and the other end in a light socket mounted in the second socket bridge first row of socket holes.

* * * * *